April 2, 1940.　　　　　F. C. BEST　　　　　2,195,507
MOTOR VEHICLE
Filed Oct. 20, 1937
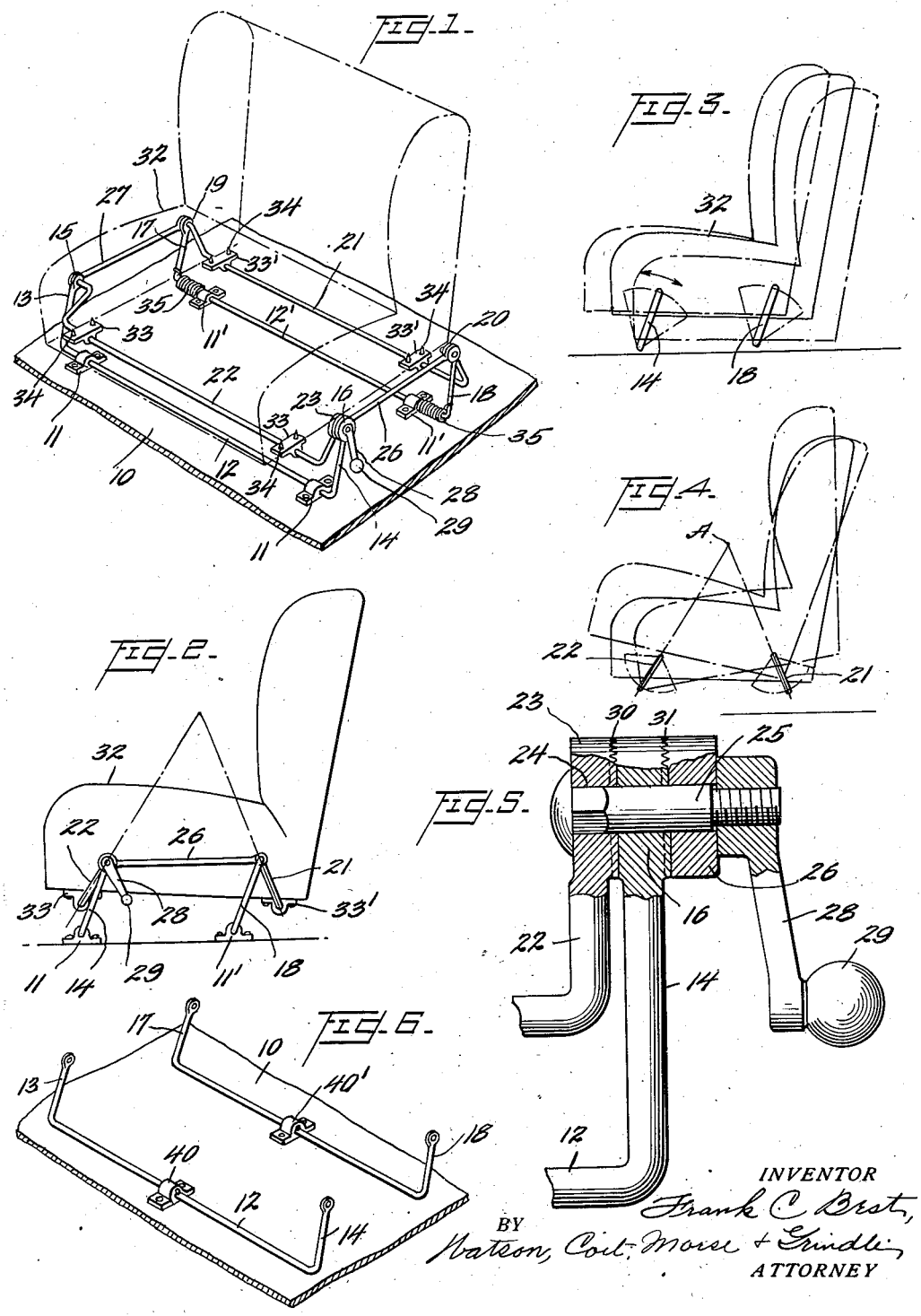
INVENTOR
Frank C. Best,
BY Watson, Coit, Morse & Grindle
ATTORNEY Patented Apr. 2, 1940

2,195,507

UNITED STATES PATENT OFFICE 2,195,507

MOTOR VEHICLE

Frank C. Best, Detroit, Mich., assignor to Packard Motor Car Company, Detroit, Mich., a corporation of Michigan Application October 20, 1937, Serial No. 170,126

10 Claims. (Cl. 155—14)

The present invention relates to adjustable seats, and particularly to an adjustable operator's seat for motor vehicles.

It has been customary, heretofore, in the construction of motor vehicles, to provide means for adjusting the operator's seat longitudinally of the vehicle, usually by slidably mounting the seat upon longitudinal members secured to the floor of the vehicle, latching means being provided for maintaining the seat in the longitudinal position to which it has been adjusted. One disadvantage of so mounting the operator's seat is that considerable frictional resistance is encountered in effecting the longitudinal adjustment of the seat, especially when the operator is sitting on the seat, thereby greatly increasing said frictional resistance. Another disadvantage of the aforesaid type of mounting resides in the latching means, considerable difficulty being experienced, at times, in effecting disengagement thereof preliminary to an adjustment of the seat.

A further deficiency of the usual manner of mounting an adjustable operator's seat, as described above, resides in the fact that no provision is made for tilting the seat about a transverse axis, the adjustment being limited to a translatory movement of the seat longitudinally of the vehicle.

A further deficiency of the aforesaid construction is that no provision is made for an adjustment of the height of the operator's seat, i. e., with relation to the level of the vehicle floor.

One object of the present invention is to avoid the aforesaid disadvantages, and to provide means whereby adjustments of the operator's seat may be made by the application of a slight force, the frictional resistance to said adjustment being reduced to a very low value.

A further object of the present invention is the provision of means for effecting a tilting adjustment of the operator's seat, such adjustment also necessitating the application of only a relatively slight force.

Another object of the present invention is the provision of means whereby the operator's seat may be simultaneously adjusted longitudinally, vertically, and angularly to the position most comfortable for the operator.

A further object is the provision of clamping means for securing the seat in the adjusted position, said clamping means being readily releasable with a minimum of effort and inconvenience.

Another object of the present invention is the provision of an adjustable seat which is biased to a predetermined position, to which it will automatically return whenever the clamping means is released and external forces are not present.

Other and further objects, features and advantages will be apparent from the following description, taken in connection with the accompanying drawing, in which:

Figure 1 is a skeleton view, in perspective, of a vehicle seat mounted according to the present invention, the seat supporting structure being shown in solid lines and the seat proper being shown in broken lines;

Figure 2 is a side elevation of a seat mounted according to the present invention;

Figure 3 is a diagrammatic view illustrating the manner in which the seat may be simultaneously adjusted longitudinally and vertically;

Figure 4 is a diagrammatic view illustrating how the tilting adjustment of the seat is effected;

Figure 5 is an enlarged detail view, partly in section, of the clamping means of Figures 1 and 2; and Figure 6 is a skeleton view, in perspective, illustrating a modification of the device of Figures 1 and 2.

In order to facilitate an understanding of the invention, reference is made to the embodiment thereof shown in the accompanying drawing and detailed descriptive language is employed. It will nevertheless be understood that no limitation of the invention is thereby intended and that various changes and alterations are contemplated such as would ordinarily occur to one skilled in the art to which the invention relates.

Referring to Figures 1 and 2, the floor of a vehicle is designated by the reference character 10. Secured to the floor 10 are spaced pairs of brackets 11 and 11' in which are journalled transverse members 12 and 12'. The transverse member 12 is formed with its respective end portions 13 and 14 upturned, and provided at their extremities with enlarged apertured heads 15 and 16 respectively.

The transverse member 12' is similarly formed, its upturned ends being designated by the reference characters 17 and 18 respectively, and being provided with apertured heads 19 and 20, respectively. Journalled in and supported by the latter is a seat supporting member 21, the main body of the member 21 being disposed eccentric to its points of support so as to form one member of a cradle-like seat supporting structure. A second seat supporting member 22 is journalled at one end in the head 15, and is provided at its opposite end with a head 23 provided with a rectangular aperture 24, in which is seated the squared portion of a bolt 25. The latter extends through and is journalled in the head 16 of the transverse member 12, and projects therebeyond to provide a pivotal mounting for one end of a link 26. The other end of the link 26 is pivotally mounted upon the adjacent end of the seat supporting member 21 which, as described above, is journalled in the head 20 of the transverse member 12'. A second link 27 pivotally connects the opposite ends of the seat supporting members 21 and 22.

Threaded upon the outer end of the bolt 25 is a crank 28 provided with a handle 29. By means of the crank 28, as will be obvious, transverse pressure may be applied to the clutch-like arrangement or clamping device comprising the head 23 of the seat supporting member 22, the head 16 of the transverse member 12, and the end of the link 26, the adjacent faces of said members being serrated as at 30 and 31 to provide suitable friction surfaces. It will therefore be apparent that if the crank 28 is rotated in a clockwise direction until a considerable transverse pressure is exerted upon the said clamping arrangement, angular movement of the seat supporting member 22 relative to the transverse member 12 is prevented, angular movement of the latter being prevented by reason of its frictional engagement with the link 26. The entire structure is therefore more or less rigidly interconnected when the crank 28 is in clamping position.

A seat 32 is supported upon the members 21 and 22 by means of brackets 33 and 33', which are journalled upon the members 21 and 22, and are rigidly secured to the underside of the seat 32 by any suitable means as for example the screws 34.

The transverse member 12' is preferably biased to a predetermined position, for example, with its end portions 17 and 18 substantially vertical, by means of springs 35. If desired, similar springs may be employed at the respective ends of transverse member 12, or any other suitable arrangement of springs may be employed for the aforesaid purpose.

It will be noted that the brackets 33 and 33' are spaced, longitudinally of the vehicle, by a distance exceeding the longitudinal distance between the points of support of the respective members 21 and 22. That is to say, the upturned portions at each end of the latter members, respectively, converge upwardly, and if prolonged, would intersect at a point approximately at the height of the center of gravity of a person occupying the seat 32, such point being designated by the reference character A (Figure 4). It will thus be obvious that if the transverse members 12 and 12' are held stationary, the seat 32 is tiltable about a transverse axis through point A. Such tilting of the seat is easily accomplished by loosening the above described clamping arrangement and exerting a slight force forwardly or rearwardly as the case may be, by rocking the body about its center of gravity. This may be accomplished without shifting the seat bodily in a longitudinal direction, since the transverse members 12 and 12' will be held in their normal position by the spring 35. The clamp is then tightened by rotating the crank 28.

If it is desired to shift the seat longitudinally, the clamp is loosened and sufficient force exerted in the desired direction to overcome the resistance of spring 35. The transverse members 12 and 12' are thus rotated in their respective journals, and the seat is moved along the path illustrated in Figure 3. It will be noted that this adjustment makes allowance not only for the length of the operator's limbs, but also for the height of his body, the seat being lowered as it moves rearwardly and raised as it moves forwardly. Obviously, both the longitudinal adjustment, with its concomitant vertical adjustment, and the tilting adjustment may be made simultaneously, after which the crank 28 is rotated to clamp the seat securely in the position to which it has been adjusted.

In the modification of Figure 6 the brackets 11 and 11' are omitted and the transverse members 12 and 12' are secured rigidly to the floor 10. For example, the members 12 and 12' may be keyed in brackets 40 and 40', which in turn are screwed or bolted to the floor 10, at points intermediate the ends of the members 12 and 12' respectively. In this case, torsional movement of the respective ends of members 12 and 12', rather than rotation of said members, is relied upon to permit the described longitudinal adjustment, and the spring 35 may of course be omitted, the seat being biased to normal position by the natural resilience of members 12 and 12'. Except for the foregoing details, the device of Figure 6 may be constructed and operated exactly as described in connection with Figures 1 to 5, inclusive.

Obviously the members 12 and 12' need not extend continuously beneath the seat, but may be divided into spaced pairs of upstanding members corresponding to their upturned portions, said upstanding members being pivotally or rigidly secured to the floor 10 as described in connection with members 12 and 12'. It will also be apparent that the novel manner of effecting the longitudinal adjustment of the present invention may be employed without the tilting feature, in which case the seat might be pivotally supported, in any suitable manner, upon the upstanding members, the offset seat supporting members 21 and 22 being unnecessary. Other modifications of the invention will occur to those skilled in the art.

From the above description it will be apparent that the present invention provides an adjustable seat mounting of inexpensive construction, which is capable of manipulation with slight effort and is adjustable simultaneously in three respects. The simplicity of the construction, furthermore, is conducive to ease of assembly and installation.

It is obvious that the usefulness of the present invention is not limited to motor vehicles, or to vehicles in general, the described construction being suitable for many other applications in which adjustable seats are employed.

Having thus described the invention, what is claimed as new and desired to be secured by Letters Patent is:

1. In combination with a structure having a floor, a plurality of transverse members pivotally secured to said floor, said members having upturned ends, means biasing said transverse members to a predetermined angular position, link members pivotally connected between adjacent upturned ends of said transverse members, a seat supporting member pivotally supported by and between the respective ends of each said transverse member, a seat supported on said seat supporting members and pivotally connected thereto, a common pivot for one of said ends of said transverse members, one of said seat supporting members, and one of said links, and clamping means for locking said pivot for securing said transverse member, its associated seat supporting member and one of its associated link members against relative movement.

2. In combination with a structure having a floor, a plurality of transverse members secured to said floor, said members having upturned ends, a seat supporting member pivotally supported by and between the respective ends of each said transverse member, and a seat supported on said seat supporting members and pivotally connected thereto, the points of connection between said respective supporting members and said seat being spaced apart longitudinally of said seat by a distance greater than the distance between the points of pivotal support of adjacent ends of said respective supporting members.

3. In combination with a structure having a floor, a plurality of transverse members secured to said floor, said members having upturned ends, a seat supporting member pivotally supported by and between the respective ends of each said transverse member, a seat supported on said seat supporting members and pivotally connected thereto, the points of connection between said respective supporting members and said seat being spaced apart longitudinally of said seat by a distance greater than the distance between the points of pivotal support of adjacent ends of said respective supporting members, and means for clamping said seat supporting members against pivotal movement relative to said transverse members.

4. In combination with a structure having a floor, a plurality of pairs of upstanding members pivotally secured to said floor, means biasing one of said upstanding members to a predetermined angular position, link members pivotally connected between corresponding members of said pairs of upstanding members, a transversely extending offset seat supporting member pivotally supported by and between the respective members of each said pair of upstanding members, a seat supported on said seat supporting members and pivotally connected thereto, and clamping means associated with one of said upstanding members for securing said upstanding member, its associated seat supporting member and one of its associated link members against relative movement.

5. In combination with a structure having a floor, a plurality of transverse members rigidly secured to said floor and having upturned ends, said members being formed of resilient material whereby their respective upturned ends are capable of torsional displacement, a seat supporting member pivotally supported by and between the respective ends of each of said transverse members, and a seat supported on said seat supporting members and pivotally connected thereto.

6. In combination with a structure having a floor, a plurality of transverse members rigidly secured to said floor and having upturned ends, said members being formed of resilient material whereby their respective upturned ends are capable of torsional displacement, a seat supporting member pivotally supported by and between the respective ends of each of said transverse members, a seat supported on said seat supporting members, and means for applying clamping pressure at the point of pivotal connection between said seat supporting member and one of the ends of one of said transverse members in order to secure those parts in angularly adjusted positions.

7. In combination with a structure having a floor, a plurality of transverse members pivotally secured to said floor, said members having upturned ends, link members pivotally connected between adjacent ends of said transverse members, a seat supporting member pivotally supported by and between the respective ends of each said transverse member, a seat supported on said seat supporting members and pivotally connected thereto, and clamping means associated with one of said transverse members for securing said transverse member, its associated seat supporting member, and one of its associated link members against relative movement.

8. In combination with a structure having a floor, a plurality of transverse members pivotally secured to said floor, said members having upturned ends, bail-like seat supporting members having outwardly directed ends pivotally supported by the respective ends of each of said transverse members, said seat supporting members having depending intermediate portions and a seat supported upon said intermediate portions and pivotally connected thereto, whereby said seat may be adjusted both angularly and longitudinally by movement of the occupant's body, and means for locking the pivotal joint between one end of one of said seat supporting members and the associated end of the corresponding transverse member, said clamping means being the sole means for retaining said seat in selected positions of either adjustment.

9. In combination with a structure having a floor, a plurality of transverse members secured to said floor, said members having upturned ends, links pivotally connecting the corresponding ends of said respective transverse members, a seat supporting member pivotally supported by and between the respective ends of each said transverse member, a seat supported on said seat supporting members and pivotally connected thereto, the points of connection between said respective supporting members and said seat being spaced apart longitudinally of said seat by a distance greater than the distance between the points of pivotal support of adjacent ends of said respective supporting members, and means for clamping said seat supporting members against pivotal movement relative to said transverse members.

10. In combination with a structure having a floor, a plurality of pairs of upstanding members pivotally secured to said floor, link members pivotally connected between the corresponding members of said pairs of upstanding members, a transversely extending depending bail-like seat supporting member having ends pivotally supported by the respective members of each of the said pairs of upstanding members, depending transverse intermediate portions of said seat supporting members being spaced apart longitudinally of said seat by a distance greater than the distance between the points of pivotal support of adjacent ends of said respective supporting members, a seat supported on said intermediate portions of said supporting members and pivotally connected thereto, whereby said seat may be adjusted both angularly and longitudinally by movement of the occupant's body, and means for locking the pivotal joint between one end of one of said seat supporting members and the associated end of the corresponding transverse member, said clamping means being the sole means for retaining said seat in selected positions of either adjustment.

FRANK C. BEST.